(12) United States Patent
Wieker

(10) Patent No.: US 10,334,785 B2
(45) Date of Patent: Jul. 2, 2019

(54) HEMP HARVESTER

(71) Applicant: Heinrich Wieker, Burgdorf (DE)

(72) Inventor: Heinrich Wieker, Burgdorf (DE)

( * ) Notice: Subject to any disclaimer, the term of this patent is extended or adjusted under 35 U.S.C. 154(b) by 0 days.

(21) Appl. No.: 15/669,333

(22) Filed: Aug. 4, 2017

(65) Prior Publication Data

US 2018/0035610 A1 Feb. 8, 2018

(30) Foreign Application Priority Data

Aug. 5, 2016 (DE) .................. 10 2016 009 715
Aug. 5, 2016 (DE) .................. 20 2016 004 904 U

(51) Int. Cl.
*A01D 45/06* (2006.01)
*A01D 45/30* (2006.01)
*D01B 1/22* (2006.01)

(52) U.S. Cl.
CPC ........... *A01D 45/065* (2013.01); *A01D 45/30* (2013.01); *D01B 1/22* (2013.01)

(58) Field of Classification Search
CPC ...... A01D 45/00; A01D 45/065; A01D 45/30; A01F 11/02; A01F 11/04; A01F 12/187
USPC ................................. 131/313–322
See application file for complete search history.

(56) References Cited

U.S. PATENT DOCUMENTS

| | | | | |
|---|---|---|---|---|
| 1,650,521 A | * | 11/1927 | Johnson | A01D 45/003 56/59 |
| 2,636,330 A | * | 4/1953 | Krause | A01D 45/021 56/11.2 |
| 5,058,369 A | * | 10/1991 | Garner | A01D 23/04 56/126 |
| 5,632,135 A | * | 5/1997 | Baker, IV | A01D 45/065 460/24 |
| 6,185,921 B1 | * | 2/2001 | Taylor | A01D 45/16 56/27.5 |
| 8,753,180 B2 | * | 6/2014 | Hutchins | A01D 45/16 131/313 |

FOREIGN PATENT DOCUMENTS

| | | | | |
|---|---|---|---|---|
| DE | 4106475 A1 | * | 9/1992 | A01D 45/00 |
| GB | 997605 A | * | 7/1965 | A01D 45/00 |
| SU | 1308245 A1 | * | 5/1987 | |

* cited by examiner

*Primary Examiner* — Alicia Torres

(57) ABSTRACT

A method and device for harvesting plants belonging to the family of hemp plants (Cannabaceae), in particular of the genus *Hemp*, with which the harvesting and separation of the individual plant parts is made possible without damaging the individual plant parts. In particular, during harvesting, the hemp stems are pulled downwards by a pair of rollers and the flowers are pulled backwards through a chain gap, whereby the flowers are stripped from the stems.

9 Claims, 2 Drawing Sheets

HEMP HARVESTER

CROSS-RELATED APPLICATIONS

This application claims the benefit of priority of German Patent Application No. 10 2016 009 715.9 DE, filed Aug. 5, 2016, and German Utility Model No. 20 2016 004 904.7, filed Aug. 5, 2016, both of which are hereby incorporated by reference.

The present invention refers to a method and device for harvesting plants belonging to the family of hemp plants (Cannabaceae), particularly the genus hemp.

Plants from the family of hemp (Cannabaceae) as well as some cereal cultivars are usually very difficult to harvest because of their long, very resistant stems. Furthermore, all plant parts can be used for processing or for use in other products, so that a separation of the individual plant parts is advantageous.

The present invention therefore refers to a method and device for harvesting plants belonging to the family of hemp plants (Cannabaceae), in particular of the genus hemp, with which the harvesting and separation of the individual plant parts is made possible.

BACKGROUND

In plants belonging to the family of hemp (Cannabaceae), especially the genus *Hemp*, demand is growing steadily since hemp plants have become a demanded crop due to their properties, for example the highly fibrous stems. The hemp fibers are suitable, for example, for papermaking, but textile production is also suitable as a building material. Oil can be obtained from the seeds, which can serve as basis for the multiple products.

The hitherto known machines for harvesting hemp plants consist of a plurality of cutting bars arranged one above the other, which cut the hemp at a fixed height. In these procedures, the cut parts, which consist of stems and seeds, fall to the ground. The stems and seeds, which are located on the ground then, are collected and separated from one another, mostly manually only in a further step.

For the grain culture machines are known, which separate the stalk and the drain by two cuts. However, machines for the cereal crop are not suitable for the harvesting of hemp plants since, unlike cereals, hemp plants are plants whose stems are partly branched and which, depending on the variety, can reach a diameter of 2 mm up to 60 mm. The stalks also have partially very strong and resistant fiber bundles which lead to malfunctions and clogging in conventional machines for the production of grain.

The invention therefore is based on the technical problem to provide a method and a corresponding device which makes it possible to jointly harvest the stems and the flowers of the hemp plant, but to separate them from one another and collect them in one mechanical step.

The method and the device of the present invention are thus intended to enable a simple, low-loss and cost-effective salvage of the stems and the flowers with grains. The technical problem is characterized by the embodiments in the claims and is described more detailed by the embodiments in the description and the drawings.

SUMMARY OF THE INVENTION

The present invention relates to a method for harvesting cannabis plants and the like, wherein the stems are cut above the soil and the flowers of the hemp plant are stripped from the stems. The hemp plants are preferably plants of the genus *Hemp*.

The present invention relates to a method for harvesting cannabis plants and the like, wherein the stems are cut above the soil and the flowers of the hemp plant are stripped from the stems. The hemp plants are preferably plants of the genus *Hemp*.

The method of the present invention is characterized by
(a) at least one pair of rollers pulling the hemp stalks downwards and
(b) at least one pair of chainguides hold the hemp stem below the flowers and pulls it backwards into the chain gap.

In one embodiment of the method, the seeds are knocked out of the flower. This knock-out is preferably effected by a shaking conveyor.

In the method according to the invention, the flowers can be collected in a separate container, aside to the container for flowers, the flowers and seeds of the plant are preferably caught in separate containers and thereby separated.

In the method, according to the invention described above, the hemp stalks are cut off 5 cm to 50 cm above the ground. Preferably, the hemp stalks are cut off 10 cm to 40 cm, particularly preferred 20 cm to 30 cm above the ground.

In the method, at least one pair of rollers is located along the direction of travel behind the mower. A pair of rollers consists of two rollers, with one roller in each case being located on the left and right of the vehicle center. The rollers of the pair of rollers move toward each other from above towards the center, in the direction of the ground.

The invention furthermore relates to a device for harvesting cannabis plants (Cannabaceae) and the like, comprising
(a) at least one upstream powered mower,
(b) at least one hemp intakefeed,
(c) at least one pair of rollers,
(d) at least one stripping pair of chains and
(e) at least one collecting container.

In a preferred embodiment, the plants are of the genus *Hemp*.

The upstream powered mower of the device according to the invention is preferably a bar knife. This bar blade is mounted at a height of 5 cm to 50 cm, preferably 10 cm to 40 cm, particularly preferred 20 cm to 30 cm above the ground. In one embodiment, the beam knife is adjustably mounted. A height-adjustable reel is preferably also installed above the mower.

In one embodiment, the device according to the invention has a hemp inlet, which moves the hemp to the center of the device.

In a preferred embodiment, the device comprises at least one pair of rollers which is located behind the mower along the direction of travel. A pair of rollers preferably consists of two rollers. In the case of a device consisting of a pair of rollers, there is a roller on the left and a roller on the right side of the vehicle center. The individual rollers of the pair of rollers preferably move towards one another from the top towards the middle.

In a particularly preferred embodiment, the device of the present invention comprises at least one stripping chain pair. The pair of stripping chains hold the hemp stem below the flowers between the chains and pull them back into the chain gap.

The device according to the invention can additionally have a vibrating path. The vibratory pathway causes the seeds to be separated from the flower.

Figure 1:
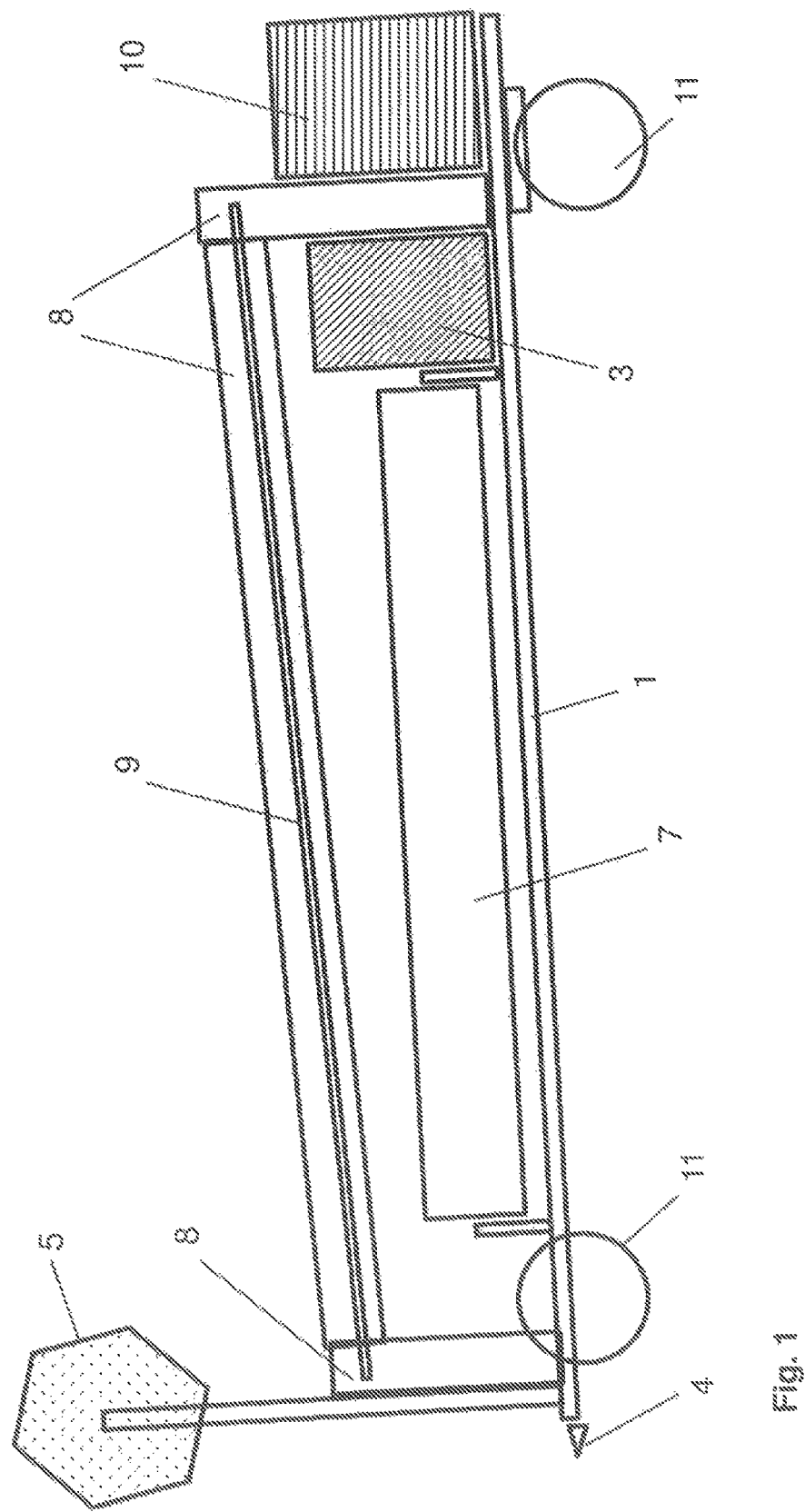
FIG. 1 shows the device—side view

The figure shows the device 1 for harvesting hemp plants with the following features: Undercarriage/chassis 1, power generator 3 (cross-striped), mower 4, reel 5 (dotted), roller pair 7, chain carrying skeleton 8, circumferential chain 9, collecting container 10 (horizontal striped), wheel 11.

Figure 2:
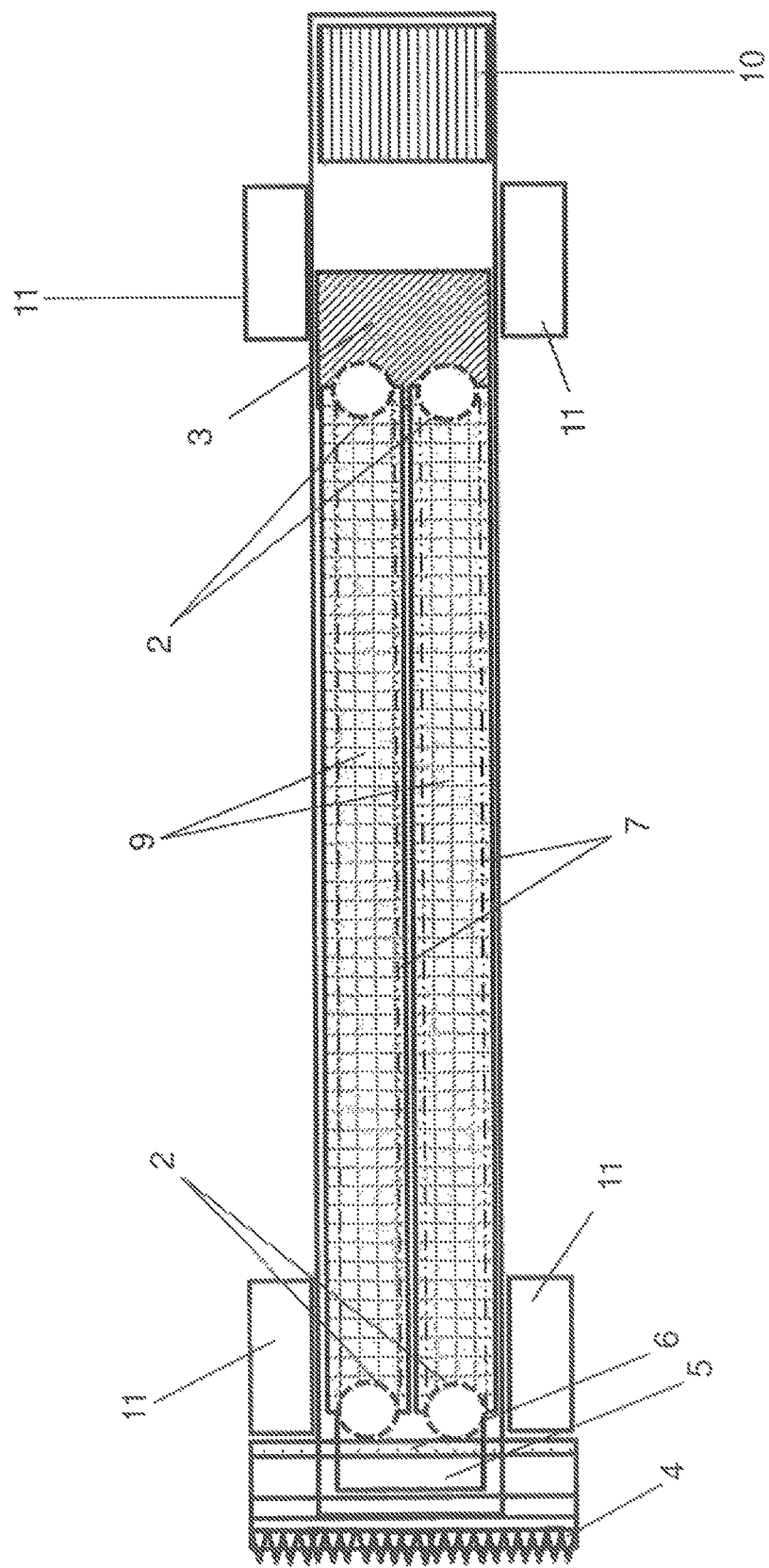

FIG. 2 shows the device—top view

Chain redirection 2 (shown in phantom), power generator 3 (cross-stripped), mower 4, reel 5 (dotted), hemp intake 6, roller pair 7 (shown in phantom below the stripping chain pair 9), circumferential chain 9(dotted line), collecting container 10 (Horizontal striped), wheel 11.

DETAILED DESCRIPTION OF THE INVENTION

The present invention relates essentially to a method for harvesting plants from the family of hemp plants (Cannabaceae) and the like, in particular of the genus *Hemp*.

The invention relates particularly to a method for harvesting hemp, wherein the hemp stalks are cut off above the ground and the hemp plant flowers are stripped from the stems. In the method, the hemp stalks are pulled downwards by a pair of rollers and the flowers are pulled backwards by a chain gap and are thereby stripped from the stalks. The chain guide holds the hemp stem below the flower and pulls it back in the chain gap. Through the backward-directed movement of the chain, the flower is pulled from the hemp stem.

The mower 4, which is used for harvesting the hemp plants, can consist of different cutting units, which can vary according to the hemp growth. The mower 4 cutting the stems above the ground is a bar knife in a preferred embodiment of the present invention. The knife is preferably located in the front region, particularly preferred at the foremost point of the device, so that the hemp plants can be cut by this at the beginning of the harvesting process. The height in which the knives are mounted varies and lies approximately at the height of the front axle. The hemp stalks can thus be cut off at different heights. In one embodiment, the hemp stalks are cut from 5 cm to 50 cm above the ground. Correspondingly, 5 cm to 50 cm of the stalk remain in the soil. In a preferred embodiment, the hemp stalks are cut 10 cm to 40 cm above the ground. In a particularly preferred embodiment, the stems are cut 20 cm to 30 cm above the ground.

In one embodiment a height-adjustable reel 5, is mounted above the mower 4. Its task is to sweep the upper parts of the hemp plants to the machine. Its layout can vary therefore. Examples of reels that accomplish this purpose are, but are not limited to, a roller, coil or cross-shaped structure which is rotatably mounted about a central axis. In a preferred embodiment, the reel 5 has four or hexagonal side parts and struts therebetween. The direction of rotation of the reel 5 is leading into the direction of travel in the upper direction, so that the upper parts of the hemp plants are swept towards the machine.

The rollers 7 are arranged behind the mower 4, which act as roller pairs 7 and pull down the hemp stems of the hemp plants by their counter-rotating movement, towards each other. The counter-rotating rotation of the individual rollers in the pair of rollers 7 is here towards the bottom from above. From the front of the device, in a two-roller version, the left-hand roller moves clockwise and the right-hand counter-clockwise. In one embodiment, the roller pairs 7 are aligned along the direction of travel. In a preferred embodiment, a pair of rollers 7 is used in which a respective roller is located to the left and right of the vehicle center. In a particularly preferred embodiment, the rollers of the pair of rollers 7 move in opposite directions (to each other) from the top towards the center toward the vehicle center. However, the present invention also includes the use of a plurality of pairs of rollers 7. The pair of rollers 7 used are driven by a drive which is supplied with energy by a power generator 3. Preferably, this is an electrical drive which is controlled by a frequency converter. The power generator 3 allows a movement of the rollers 7, which is opposite to each other and runs in the direction of the bottom when viewed from above.

In a further particularly preferred embodiment, all the drives can also be operated hydraulically. The hydraulic pressure being generated by a device carrier (tractor) which carries the hemp harvesting device. Preferably, the harvesting device is attached to the front load reception of the tractor and the hydraulics are connected to the device carrier by means of quick-release fasteners. Four support wheels on the device ensure that the cutterbar does not hit on the ground and they make the uncoupled harvesting device easily slidable over flat surfaces.

The individual rollers of the roller pairs 7 are pressed against each other by means of spring force or pneumatics and pull the hemp stalks downwards. The hemp stalks remain under the machine by the opposing (to each other) movement of the two rollers of the roller pair and form the swath.

Above the pair of rollers 7 is a circumferential chain 9 which strips the flowers from the stem. In one embodiment, a circumferential chain 9 is located on the right and left of the roller pair respectively. If only one roller pair 7 is mounted, the circumferential chain 9 is located on the right and left of the machine center. The chains 9 are guided on a support frame 8 via spring-loaded chain guides and pressed against each another. As a result, the hemp stalks are caught below the flowers between the chains 9 and pulled back in the chain gap. Due to the simultaneous downward movement of the stems which happens through the rollers 7, the flowers on the chain 9 are stripped off.

The skeleton 8, which carries the circumferential chain 9, is made up of bend-resistant scaffolds mounted in the longitudinal direction. In one embodiment, the chain carrying support framework pair 8 is mounted in the front and rear areas of the device. In a preferred embodiment, the chain carrying support frame pair 8 comprises two vertical posts and one horizontal truss. The truss consists of triangular grating tube elements. In a preferred embodiment, the two opposing traverses form a channel towards the center. Through the gutter, or in it, the stripped flowers are conveyed into the rear part.

In a further embodiment, the seeds are additionally detached from the flower. The seeds are preferably mechanically knocked out of the flowers. Various possibilities of extracting the seed from the flowers are known from the cereal culture, such as for example beating out or rolling out. The known methods for removing the seed without damaging it can be used in the process according to the invention. A shaking conveyor is a preferred way of triggering, since the seeds are released from the flower in a simple manner by the jogging, without being damaged, which could be the case, for example, during the blow-out.

In a preferred embodiment, the flowers are collected in a separate container 10. If, in addition, the seed is detached from the flower, it is also preferably collected in a separate container 10. Alternatively, the flowers and I or seeds can also be caught in a collector cart. Separation of the flower from the seed can happen by means of the shaking conveyor, but a separation is also possible or additionally by hand, but also mechanically, for example according to the principle of air resistance. By means of a generated air stream, the heavier released seeds are separated from the flower and can thus be separated.

The present invention also relates to a corresponding device for harvesting hemp plants or the like, preferably the hemp plants or the like are plants of the genus *Hemp*. The device comprises a running gear 1, which serves as a connection of the chassis over the wheels to the roadway. Conventional undercarriages are state of the art and can be used in the present device. In a preferred embodiment, the chassis 1 comprises a base frame, a driven, rigid front axle and a driven rear axle mounted on a rotary platform.

The drive is, as is the steering, over, common procedures. Preferably, both travelling drives are controlled by frequency converters. In this case, the steering is effected in the usual embodiment with a positioning motor which positions the rotary platform. The electrical energy for the power generator 3, which produce the respective movements, is preferably generated by a three-phase three-phase generator with a combustion engine as the drive. However, electric motors, Stirling engines, hydraulic motors and gas-driven motors can also be used to generate the necessary energy.

In one embodiment, the device can also be designed as an attached unit to a tractor. Steering and drive is performed by the device carrier. This can have a combustion engine or an electric drive. The harvesting device then does not have its own energy generator and is preferably driven by the hydraulics of the device carrier.

The device according to the invention comprises an upstream driven mower 4, a hemp inlet 6, a pair of rollers 7 and a pair of wiper chains, thereby permitting the harvesting of plants from the cannabaceae family and the like, in particular of the genus *Hemp*. By means of the device according to the invention, the hemp stalks are cut off above the ground by the mower 4. The mower 4 can consist of different cutting units, which are also used in crop cultivation. The mower 4 cutting the stems above the ground is a bar knife in a preferred embodiment of the present invention. The knife bars are preferably located in the front region of the device. In a particularly preferred embodiment, at the foremost point of the device. The knife bars can be mounted at a fixed height. This is in an embodiment at the height of the front axle, H. Depending on the device, at a height between 5 cm to 50 cm, preferably 10 cm to 40 cm, particularly preferred at a height of 20 cm to 30 cm. Accordingly, the hemp stalks are cut off 5 cm to 50 cm above the ground, whereby 5 cm to 50 cm of the stalk can remain in the soil. In a preferred embodiment, the hemp stalks are cut 10 cm to 40 cm above the ground. In a particularly preferred embodiment, the stems become cut off 20 cm to 30 cm above the ground. However, the height of the knife bars can also be variable, so that the knife bars are not fixed, but are adjustably mounted as desired or suitable for the specific hemp plants.

A reel 5 placed above the mower 4 leans the plant gently toward the device so that the flowers and seeds do not fall back onto the field. In a preferred embodiment, the reel 5 strokes the plant in the direction of the subsequently introduced pair of rollers and the chain guide where the hemp stems are caught with the flowers and separated from one another. The coder may have a roller, coil or cross-shaped structure which is rotatably mounted about an axis of the central axis. However, the coiler 5 is not limited to such embodiments. In a preferred embodiment, the reel 5 comprises four or hexagonal side pieces and struts therebetween. In order to achieve the desired effect, the reel 5 rotates with the direction of travel so that the upper parts of the hemp plants are swept towards the machine.

Rollers 7 are arranged downstream of the mower 4 and act as a pair of rollers 7 and, by their movement directed towards each other, draw the hemp stalks of the hemp plants downwards. In this case, the movement of the individual rollers in the roller pair 7 is towards the bottom relative to one another. The roller pairs 7 are aligned in one embodiment along the direction of travel. In a preferred embodiment, a pair of rollers 7 is used in which a respective roller is located to the left and right of the vehicle center. In a particularly preferred embodiment, at least one pair of rollers 7 is used. However, the present invention also comprises the use of a plurality of pairs of rollers 7 which are arranged along the direction of travel. When a plurality of roller pairs 7 are used, the individual roller pairs 7 preferably operate separately without interacting with other roller pairs 7. The rollers are driven by a frequency-controlled motor. This allows movement of the rollers.

In another preferred embodiment, the rollers are driven by a hydraulic motor which is powered by the hydraulic pump of a device carrier. This applies to the design as an attachment on a tractor as well as to all other drives such as chain drive, cutterbar drive and coiler motor.

The individual rollers of the respective roller pairs 7 are pressed together and pull the hemp stalks downwards. The clamping is effected by means of spring force or pneumatics. By the pulling movement, which runs towards the ground, the hemp stalks remain under the machine and form the swath.

Above a pair of rollers 7 there is a circumferential chain 9 in the device according to the invention, which strips the flowers from the stem. This chain is preferably designed as a chain pair. In one embodiment, a circumferential chain 9 is located on the right and left of the roller pair. If only a pair of rollers 7 is mounted, the circumferential chain 9 is situated on the right and left of the machine center. If the number of rollers 7 increases, the number of pairs of stripping chains increases correspondingly. Spring-loaded chain guides, which guide the chains and press against each other, are mounted on a support frame 8. The movement of the chains 9 is toward the end of the device, that is, against the direction of travel. By means of this movement of the at least one stripping chain pair, the hemp stalks are caught between the chains 9 below the flowers and pulled back into the chain gap. Because of the simultaneous downward movement of the stems through the rollers and the backward movement of the pair of stripping chains, the flowers are stripped on the chain.

The chain carrying skeleton 8, which carries the chain pair, consists of a rigid construction which is mounted in the longitudinal direction relative to the direction of travel. In one embodiment, the chain support framework is mounted in the front and rear areas of the device. In a preferred embodiment, the chain support frame pair comprises two vertical posts and one horizontal truss. The truss comprises triangular tube elements. In a preferred embodiment, the two opposing traverses form a gutter towards the center. Through the gutter or in the gutter, the stripped flowers are conveyed into the rear part.

In a further embodiment, the seeds are additionally detached from the flower. The seeds are preferably mechanically shaken out of the flowers. One possibility is a shaker, which causes the flowers to move through crankshafts in a reciprocal motion and thus to release the seeds. Possibilities of extracting the seed from the flowers are known from the crop culture, such as, for example, beating out or rolling out and can also be used in this device and the corresponding method. A vibrating conveyor is a preferred way of triggering, since the seeds are released from the flower in a simple manner by the jogging, without being damaged, which could be the case, for example, during the blow-out. Depending on the number of pairs of rollers and chain pairs, either a larger vibrating conveyor can be used to trap all flowers and seeds, or several adjacent paths. A separation of flower and seed is also possible, or additionally by hand, but also mechanically, for example according to the principle of wind resistance. In this embodiment, the separation is performed alternatively or additionally by a light air stream.

In a particularly preferred embodiment, the flowers are collected in a separate container 10. If a plurality of pairs of rollers 7 and pairs of stripping chains are arranged in one. The collecting container 10 can vary accordingly in size, so that it can catch all flowers. However, a plurality of collecting containers 10 may also be arranged next to one another and/or after another on the device. If, in addition, the seed is detached from the flower, it is also preferably collected in a separate container 10. The container 10 for the seed is in this case in front of the container 10 for the flowers, since the heavier seeds fall downwards earlier. Alternatively, the flowers and/or seeds can also be caught in a lattice carriage.

What is claimed is:

1. A method for harvesting plants of the hemp genus, hemp stems being cut off above ground and flowers of the hemp plant being stripped from the stems, wherein
   (a) at least one pair of counter-rotating rollers (7) of a device for harvesting hemp are aligned along the direction of travel, and wherein the rollers are pressed against each other and pull the hemp stems downwards to the ground; and
   (b) at least a pair of circumferential chains (9) of the device for harvesting hemp located above the at least one pair of rollers (7) which holds the hemp stem below the flowers and pulls the flowers backwards in a chain gap.

2. The method according to claim 1, in which seeds of the flowers of the hemp plant are further knocked out of the flower.

3. The method according to claim 1, wherein the hemp stems are cut off 5 cm to 50 cm above the ground.

4. The method according to claim 1, wherein the roller pair (7) is located behind a mower (4) of the device for harvesting hemp, and wherein one roller of the roller pair (7) is located on the left and one roller of the roller pair (7) is located right of the center of the device.

5. A device for harvesting hemp, comprising:
   (a) at least one front-mounted driven mower (4),
   (b) at least one hemp inlet (6), wherein the hemp inlet (6) moves the hemp to the center of the device,
   (c) at least one pair of counter-rotating rollers (7), wherein the rollers are pressed against each other and pull the hemp stems downwards,
   (d) at least one circumferential chain pair (9) located above the at least one pair of rollers (7) which holds the hemp stem below the flowers and pulls the flowers backwards in a chain gap, thereby stripping the flowers from the stems, and
   (e) at least one collecting container (10).

6. The device according to claim 5, wherein
   (a) the front-mounted driven mower (4) is a bar blade and is 5 cm to 50 cm above the ground, and a height-adjustable reel (5) is installed above the mower (4); and
   (b) the pair of rollers (7) is located behind the mower (4) along the direction of travel.

7. The device according to claim 5, wherein one roller of the at least one pair of counter-rotating rollers (7) is located on the left and one roller is located on the right of the center of the device.

8. The device according to claim 5, further comprising a vibrating path, wherein seeds of the hemp are removed from a flower.

9. The method according to claim 1, wherein the rollers of the at least one pair of counter-rotating rollers (7) are moving towards the center of the device.

* * * * *